(12) United States Patent
Kusase et al.

(10) Patent No.: US 7,969,057 B2
(45) Date of Patent: Jun. 28, 2011

(54) SYNCHRONOUS MOTOR WITH ROTOR HAVING SUITABLY-ARRANGED FIELD COIL, PERMANENT MAGNETS, AND SALIENT-POLE STRUCTURE

(75) Inventors: Shin Kusase, Oobu (JP); Keiji Kondou, Toyota (JP); Takeo Maekawa, Okazaki (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 12/458,019

(22) Filed: Jun. 29, 2009

(65) Prior Publication Data
US 2009/0322176 A1    Dec. 31, 2009

(30) Foreign Application Priority Data

Jun. 30, 2008 (JP) ................................ 2008-170732
Mar. 10, 2009 (JP) ................................ 2009-056619

(51) Int. Cl.
*H02K 1/22* (2006.01)
*H02K 21/04* (2006.01)

(52) U.S. Cl. .................. 310/181; 310/162; 310/156.72; 310/263

(58) Field of Classification Search ............. 310/156.66–156.73, 162, 164, 310/168, 181, 263
See application file for complete search history.

(56) References Cited

U.S. PATENT DOCUMENTS

| 5,604,390 | A  | * | 2/1997  | Ackermann ............. 310/156.56 |
|-----------|----|---|---------|-----------------------------------|
| 6,680,557 | B2 | * | 1/2004  | Kusase .......................... 310/263 |
| 7,078,840 | B2 | * | 7/2006  | Kusase .......................... 310/116 |
| 7,642,691 | B2 | * | 1/2010  | Morita et al. ................... 310/263 |
| 2004/0080235 | A1 | * | 4/2004 | York ............................. 310/263 |
| 2006/0290316 | A1 |  | 12/2006 | Seguchi et al. |
| 2007/0284963 | A1 | * | 12/2007 | Mukai et al. ................... 310/263 |

FOREIGN PATENT DOCUMENTS

| JP | A-11-089193   | 3/1999  |
| JP | A-2004-236400 | 8/2004  |
| JP | A-2005-304166 | 10/2005 |
| JP | A-2006-12821  | 5/2006  |
| JP | A-2007-185082 | 7/2007  |

* cited by examiner

*Primary Examiner* — Tran N Nguyen
(74) *Attorney, Agent, or Firm* — Oliff & Berridge, PLC

(57) ABSTRACT

A rotor of a synchronous motor includes a rotating shaft, a plurality of segments, a plurality of permanent magnets, and a field coil. The segments are located radially outward of the rotating shaft and arranged in the circumferential direction of the rotating shaft at a predetermined pitch with spaces formed therebetween. Each of the segments has a recess making up a magnetic reluctance portion and an opposite pair of ends making up salient-pole portions. Each of the permanent magnets is disposed in one the spaces between the segments with a predetermined orientation of its N and S poles. The field coil is wound around the segments to extend in the circumferential direction of the rotating shaft through the recesses of the segments. The field coil creates, when energized with DC current, magnetic flux which magnetizes the pair of ends of each of the segments in opposite directions.

7 Claims, 10 Drawing Sheets

SYNCHRONOUS MOTOR WITH ROTOR HAVING SUITABLY-ARRANGED FIELD COIL, PERMANENT MAGNETS, AND SALIENT-POLE STRUCTURE

CROSS-REFERENCE TO RELATED APPLICATION

This application is based on and claims priority from Japanese Patent Applications No. 2008-170732, filed on Jun. 30, 2008, and No. 2009-056619, filed on Mar. 10, 2009, the contents of which are hereby incorporated by reference into this application.

BACKGROUND OF THE INVENTION

1. Technical Field of the Invention

The present invention relates generally to electric motors. More particularly, the invention relates to an improved synchronous motor which includes a rotor having a field coil, permanent magnets, and a salient-pole structure.

2. Description of the Related Art

There is known, for example from Japanese Patent First Publications No. H11-89193 and No. 2006-121821, a synchronous reluctance motor which includes a rotor with a salient-pole structure and a stator with a stator coil.

In the salient-pole structure, a plurality of salient-pole portions are alternately arranged with a plurality of magnetic reluctance portions in the circumferential direction of the motor at an electrical angular pitch of ($\pi/2$). On the other hand, the stator coil creates a rotating magnetic field upon being energized with sinusoidal AC current. The rotating magnetic field is synchronized with rotation of the rotor, producing reluctance torque.

Moreover, defining a rotating coordinate system with d and q axes on the rotor, the reluctance torque can be represented as $(L_d - L_q) \times I_d \times I_q$, where $L_d$ is the d-axis inductance of the motor, $L_q$ is the q-axis inductance of the motor, $I_d$ is the d-axis current of the motor (i.e., the d-axis component of the AC current supplied to the stator coil), and $I_q$ is the q-axis current of the motor (i.e., the q-axis component of the AC current supplied to the stator coil). In addition, the rotating coordinate system, which rotates along with the rotor, is so defined that the inductance of the motor is highest in the d-axial direction and lowest in the q-axial direction.

Further, there are also known various types of salient-pole structures, such as a flux barrier type and a segment type.

However, with those known types, the efficiency of the motor is decreased due to the loss of AC current for creating the rotating magnetic field, thereby lowering the power density of the motor. Accordingly, it is desired to increase the salient-pole ratio ($L_d/L_q$) of the motor, thereby increasing the reluctance torque of the motor.

Moreover, in the known synchronous reluctance motor, all the magnetic flux transferred between the stator and the rotor is created by supplying the AC current to the stator coil. In general, the stator coil is configured to have a relatively small number of turns so as to decrease the reactance of the stator coil. Accordingly, to create all the magnetic flux, it is necessary to supply relatively heavy AC current to the stator coil. However, this will increase the copper loss (or ohmic loss) of the stator coil, thereby lowering the efficiency of the motor.

Alternatively, the magnetic flux can be created on the rotor side by employing a Lundell-type rotor core with a field coil wound thereon. However, in this case, the field coil is to be energized with DC current; further, the field coil would have a relatively large number of turns to decrease the DC current supplied thereto. Consequently, it would be difficult to quickly change the torque generated by the motor.

To solve the above problem, one may consider employing an IPM (Interior Permanent Magnet) synchronous motor which has both a salient-pole structure and permanent magnets embedded in the rotor; the IPM motor thus can generate both reluctance torque and magnet torque (i.e., torque generated by utilizing the magnetic flux created by the permanent magnets). However, in this case, to generate high magnet torque at a low speed of the motor, the permanent magnets are required to be capable of creating strong magnetic flux; this would make the permanent magnets expensive. On the other hand, at a high speed of the motor, the strong magnetic flux created by the permanent magnets would induce a large back electromotive force in the stator coil of the motor. To overcome the large back electromotive force, it is necessary to supply a high AC current to the stator coil; this would significantly increase the copper loss of the stator coil.

SUMMARY OF THE INVENTION

According to the present invention, there is provided a synchronous motor which includes a stator and a rotor surrounded by the stator. The stator includes a stator core and a multi-phase stator coil to create a rotating magnetic field. The rotor includes a rotating shaft about which the rotor rotates, a plurality of segments made of a soft magnetic material, a plurality of permanent magnets, and a field coil. The segments are located radially outward of the rotating shaft and arranged in the circumferential direction of the rotating shaft at a predetermined pitch with spaces formed therebetween. Each of the segments has a recess and a pair of ends. The recess is formed in a circumferentially-central portion of the segment and recessed radially inward from the radially outer periphery of the rotor to make up a magnetic reluctance portion. The pair of ends are opposed to each other in the circumferential direction of the rotating shaft, with the recess interposed therebetween, to respectively make up a pair of salient-pole portions. Each of the permanent magnets is disposed in one of the spaces between the segments and belongs to one of first and second groups. The permanent magnets of the first group are alternately arranged with the permanent magnets of the second group in the circumferential direction of the rotating shaft. Each of the permanent magnets of the first group has its N (North) pole located forward of its S (South) pole in a clockwise direction. Each of the permanent magnets of the second group has its N pole located forward of its S pole in a counterclockwise direction. The field coil is wound around the segments to extend in the circumferential direction of the rotating shaft through the recesses of the segments. The field coil is configured to create, when energized with DC current, magnetic flux which magnetizes the pair of ends of each of the segments in opposite directions.

According to one preferred embodiment of the invention, the rotor further includes a plurality of second permanent magnets. Each of the second permanent magnets is disposed in the recess of a corresponding one of the segments and has its N and S poles opposed to each other in the circumferential direction of the rotating shaft so as to magnetize the corresponding segment in the opposite direction to the field coil.

According to another preferred embodiment of the invention, the rotor is configured with a Lundell-type rotor core that is made of a soft magnetic material. Each of the segments of the rotor is made up of a circumferentially-adjacent pair of claw-pole portions of the rotor core.

According to yet another preferred embodiment of the invention, the rotor further includes a plurality of soft magnetic members and a second field coil. Each of the soft magnetic members is connected in parallel with a corresponding one of the permanent magnets to magnetically short-circuit the corresponding permanent magnet. The second field coil is wound around the soft magnetic members to extend in the circumferential direction of the rotating shaft, so as to allow control of magnetic flux flowing in the soft magnetic members through control of field current supply to the second coil.

Preferably, the rotor is configured with a Lundell-type tandem rotor core that is made of a soft magnetic material. Each of the segments and soft magnetic members of the rotor is made up of a circumferentially-adjacent pair of claw-pole portions of the rotor core.

According to still another preferred embodiment of the invention, the stator core surrounds the rotor to face the rotor in the radial direction of the rotating shaft. The stator core includes a plurality of stator teeth that are formed on the radially inner periphery of the stator core to protrude radially inward. The stator teeth are arranged in the circumferential direction of the rotating shaft at a predetermined pitch, forming slots therebetween. Further, Tw<Mw, where Tw is a circumferential width of each of the stator teeth at a radially inner end thereof, and Mw is a circumferential width of each of the permanent magnets at a radially outer end thereof.

Preferably, each of the stator teeth has formed, at the radially inner end thereof, a protrusion that protrudes in the direction opposite to a rotation direction of the rotor. The protrusion tapers in the direction opposite to the rotation direction of the rotor, so that Tb>Td, where Tb is a width of the protrusion in the radial direction of the rotating shaft at a base of the protrusion, and Td is a width of the protrusion in the radial direction at a tip of the protrusion. A protruding height Tc of the protrusion is substantially equal to Tb. Each pair of side walls of the stator teeth which define one of the slots are substantially parallel to each other. Further, Te>2Tc, where Te is a circumferential width of each of the slots at a radially inner end thereof.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
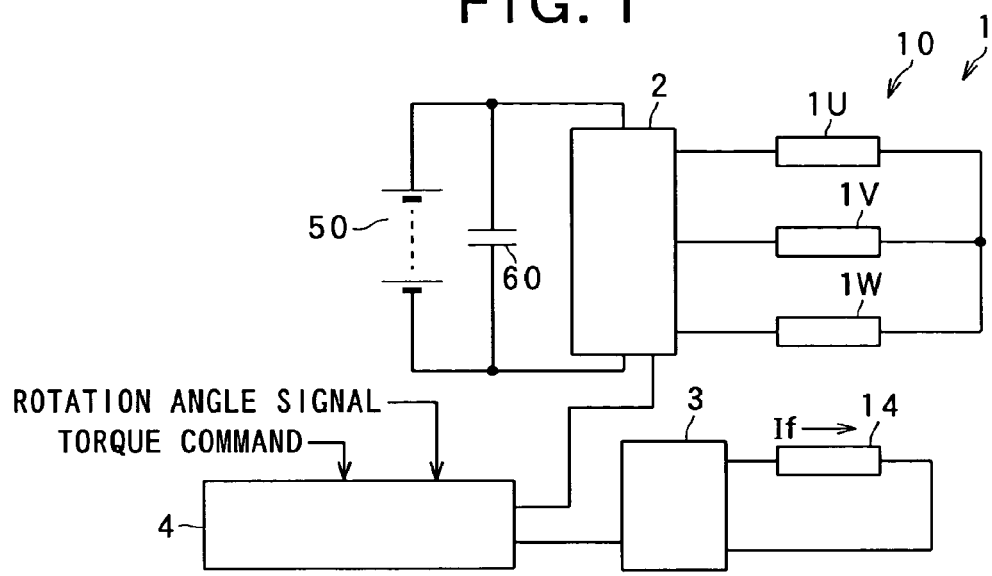
FIG. 1 is a schematic functional block diagram showing an electric circuit for powering a synchronous motor according to the first embodiment of the invention.

Preferred embodiments of the present invention will be described hereinafter with reference to FIGS. 1-16.

It should be noted that, for the sake of clarity and understanding, identical components having identical functions in different embodiments of the invention have been marked, where possible, with the same reference numerals in each of the figures.

First Embodiment

Figure 2:
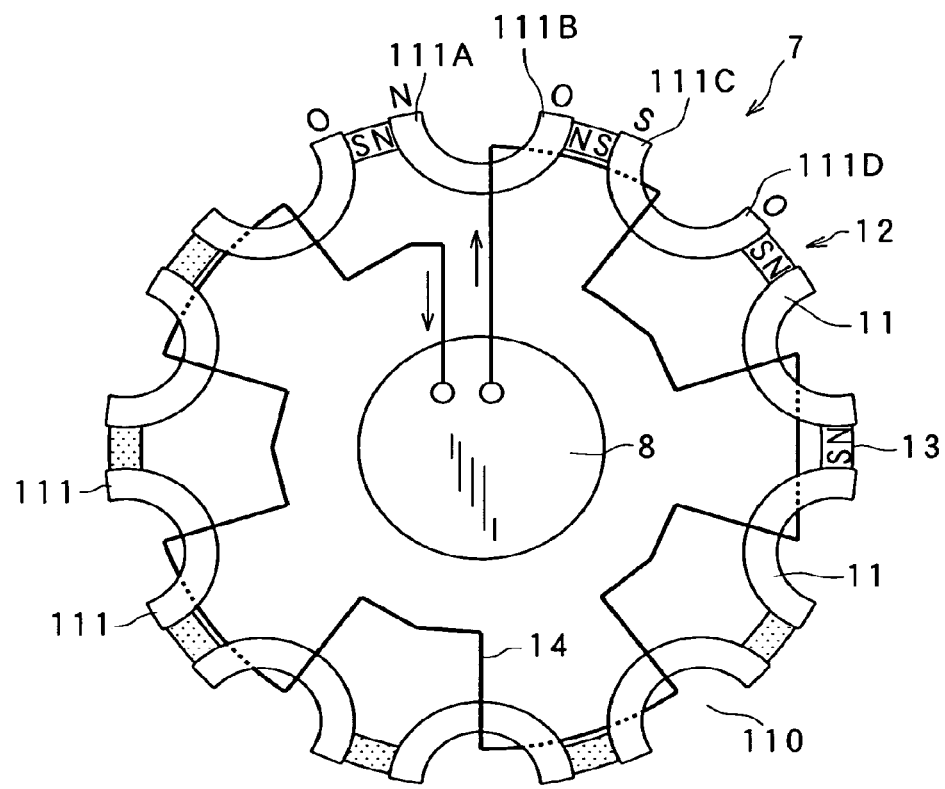
FIG. 2 is a schematic view showing the overall structure of a rotor of the synchronous motor according to the first embodiment, wherein the rotor is viewed along the axial direction thereof.

FIG. 1 shows an electric circuit for powering a synchronous motor according to the first embodiment of the invention. FIG. 2 shows the overall structure of a rotor of the synchronous motor.

In FIG. 1, reference numeral 1 denotes the synchronous motor which is of an inner-rotor type; reference numeral 2 denotes a three-phase inverter; reference numeral 3 denotes a field current control circuit; reference numeral 4 denotes a controller that is configured with a microcomputer and functions to control both the inverter 2 and the field current control circuit 3; reference numeral 50 denotes a battery; and reference numeral 60 denotes a smoothing capacitor.

The synchronous motor 1 includes a stator 6 and a rotor 7 surrounded by the stator 6. In the present embodiment, the stator 6 has a well-known structure in which a three-phase stator coil 10 is mounted in slots of a stator core; therefore, the stator 6 is not shown in FIGS. 1 and 2. The three-phase stator coil 10 is composed of a U-phase coil 1U, a V-phase coil 1V, and a W-phase coil 1W that are star-connected. On the other hand, the rotor 8 is surrounded by the stator 6 and includes a field coil 14.

The inverter 2 converts DC power output from the battery 5 to three-phase AC power. The obtained three-phase AC power is then supplied to the stator coil 10 of the motor 1. In addition, it should be appreciated that the synchronous motor 1 can also function as a synchronous generator by operating the inverter 2 as a three-phase full-wave rectifier. The field current control circuit 3 controls supply of DC field current to the field coil 14 of the rotor 7.

The controller 4 receives both a rotation angle signal output from a rotation angle sensor and a torque command output from an external device or circuit; the rotation angle signal indicates the rotation angle of the rotor 7 sensed by the rotation angle sensor; the torque command indicates a target torque of the motor 1. Then, the controller 4 determines, based on the received rotation angle signal and torque command, both target three-phase AC current and target field current If. Thereafter, the controller 4 outputs a first command signal to the inverter 2, thereby commanding the inverter 2 to output the target three-phase AC current to the stator coil 10 of the motor 1; the controller 4 also outputs a second command signal to the field current control circuit 3, thereby commanding the circuit 3 to output the target field current If to the field coil 14 of the motor 1.

The electric circuit for powering the synchronous motor 1 is essentially the same as that for powering an ordinary field coil-type synchronous motor. Accordingly, the more detailed explanation of the electric circuit is omitted hereinafter.

Next, the structure of the rotor 7 of the synchronous motor 1 will be described with reference to FIG. 2.

In the present embodiment, the rotor 7 includes a rotating shaft 8 to rotate about it. The rotor 7 further includes a plurality of (e.g., 10 in FIG. 2) segments 11, a plurality of permanent magnets 13, and the field coil 14.

The segments 11 are made of a soft magnetic material and located radially outward of the rotating shaft 8. Moreover, the segments 11 are arranged in the circumferential direction of the rotating shaft 8 at a predetermined pitch, forming spaces 12 therebetween.

Each of the segments 11 is substantially "C"-shaped to have a recess 110 and a pair of ends 111. The recess 110 is formed in a circumferentially-central portion of the segment 11 and recessed radially inward from the radially outer periphery of the rotor 7. The recess 110 makes up a magnetic reluctance portion 10. The pair of ends 111 are opposed to each other in the circumferential direction of the rotating shaft 8 with the recess 110 interposed therebetween. Each of the ends 111 makes up a salient-pole portion 111.

All of the magnetic reluctance portions 110 and the salient-pole portions 111 together make up a salient-pole structure of the rotor 7. In the salient-pole structure, the magnetic reluctance portions 110 and the salient-pole portions 111 are arranged in the circumferential direction of the rotating shaft 8 at an electrical angular pitch of ($\pi/2$). Accordingly, with the salient-pole structure, the motor 1 can function as a synchronous reluctance motor to produce reluctance torque.

Moreover, in the rotor 7, the sum of the widths of each adjacent pair of one of the segments 11 and one of the spaces 12 in the circumferential direction of the rotating shaft 8 is equivalent to an electrical angle of $\pi$. Accordingly, the pair of ends (i.e., salient-pole portions 111) of each of the segments 11 are apart from each other by approximately $\pi$ in electrical angle.

Each of the permanent magnets 13 is disposed in one of the spaces 12 between the segments 11. In the present embodiment, all the permanent magnets 13 are classified into first and second groups. Each of the permanent magnets 13 of the first group has its N (North) pole located forward of its S (South) pole in a clockwise direction. Consequently, each of the permanent magnets 13 of the first group magnetizes the pair of segments 11 which are adjacent to the permanent magnet 13 in the clockwise direction. On the other hand, each of the permanent magnets 13 of the second group has its N pole located forward of its S pole in a counterclockwise direction. Consequently, each of the permanent magnets 13 of the second group magnetizes the pair of segments 11 which are adjacent to the permanent magnet 13 in the counterclockwise direction. Further, the permanent magnets 13 of the first group are alternately arranged with those of the second group in the circumferential direction of the rotating shaft 8.

Accordingly, the segments 11 of the rotor 7 can also be classified into first and second groups. Each of the segments 11 of the first group is magnetized, by both the N poles of the permanent magnets 13 which are adjacent to the segment 11, to have N polarity. On the other hand, each of the segments 11 of the second group is magnetized, by both the S poles of the permanent magnets 13 which are adjacent to the segment 11, to have S polarity. Further, the segments 11 of the first group are alternately arranged with those of the second group in the circumferential direction of the rotating shaft 8. Consequently, there is formed, in the motor 1, a magnetic circuit in which the magnetic flux created by the permanent magnets 13 flows out of the segments 11 of the first group, passes through the stator 6, and then flows into the segments 11 of the second group. Accordingly, with the magnetic circuit, the motor 1 can also function as a permanent magnet-type synchronous motor to produce "magnet torque" (i.e., torque produced by utilizing the magnetic flux created by the permanent magnets 13).

The field coil 14 is so wound around the segments 11 that it sequentially passes through the recesses 110 of the segments 11 to extend in the circumferential direction of the rotating shaft 8. The field coil 14 creates, when energized with the DC field current If, magnetic flux which magnetizes the pair of salient-pole portions 111 of each of the segments 11 in opposite directions. Accordingly, with the field coil 14 of the rotor 7, the motor 1 can also function as a field coil-type synchronous motor to produce "field current torque" (i.e., torque produced by utilizing the magnetic flux created by supplying the field current If to the field coil 14).

Therefore, the synchronous motor 1 according to the present embodiment can produce the reluctance torque, the magnetic torque, and the field current torque by suitably controlling the stator current (i.e., the three-phase AC current supplied to the stator coil 10) and the field current If.

The relationship between the reluctance torque, the magnetic torque, and the field current torque will now be described with reference to FIGS. 3-5.

Figure 3:
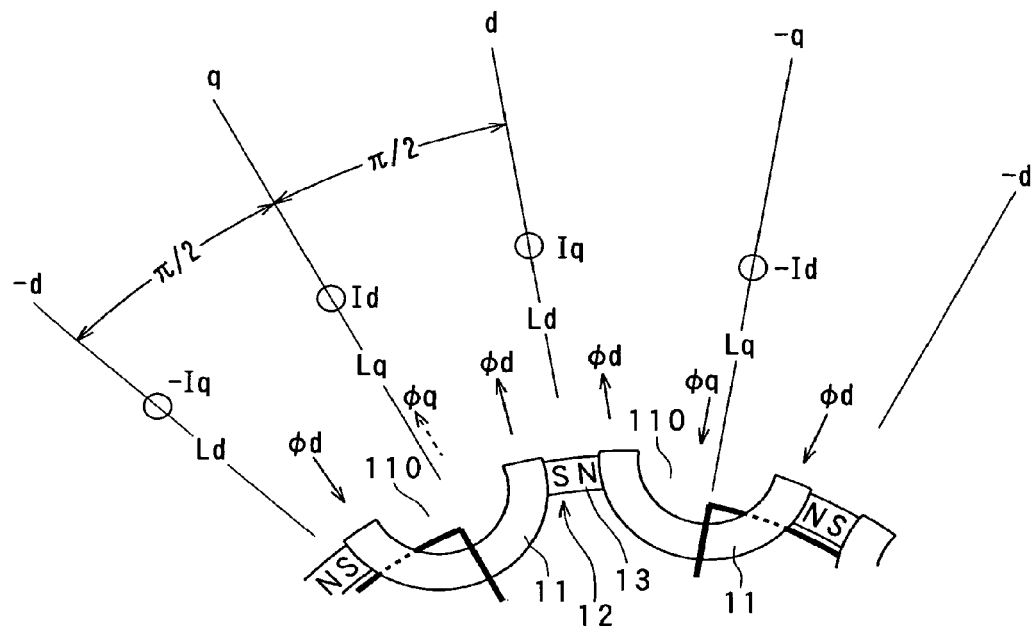
FIG. 3 is a schematic view of the rotor of FIG. 2 illustrating generation of reluctance toque in the synchronous motor according to the first embodiment.

FIG. 3 illustrates generation of the reluctance torque in the synchronous motor 1, neglecting those of the magnet torque and the field current torque.

First, a rotating coordinate system is defined on the rotor 7, which has d and −d axes passing through the circumferential centers of the permanent magnets 13 (i.e., the circumferential centers of the spaces 12 between the segments 11) and q and −q axes passing through the circumferential centers of the segments 11. Further, let Ld be the d-axis inductance of the motor 1; let Lq be the q-axis inductance of the motor 1; let Id be the d-axis current of the motor 1 (i.e., the d-axis component of the stator current); and let Iq be the q-axis current of the motor 1 (i.e., the q-axis component of the stator current). Then, the reluctance torque Tr produced by the motor 1 can be represented as $(Ld-Lq) \times Id \times Iq$.

In the present embodiment, there are provided two of the recesses 110 of the segments 11 and one of the spaces 12 between the segments 11 in the magnetic path between the q and −q axes, thereby making the q-axis inductance Lq small. Consequently, the reluctance torque Tr can be made large.

Figure 4:
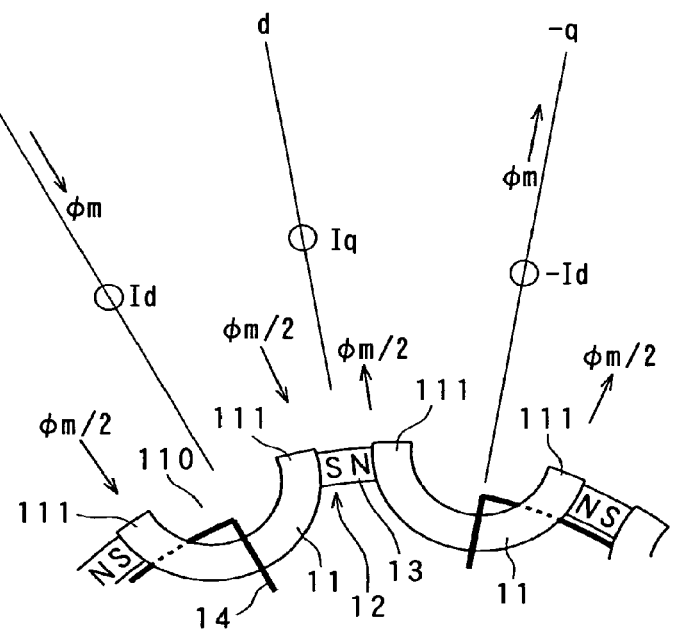
FIG. 4 is a schematic view of the rotor of FIG. 2 illustrating generation of "magnet torque" in the synchronous motor according to the first embodiment.

FIG. 4 illustrates generation of the magnet torque in the synchronous motor 1, neglecting those of the reluctance torque Tr and the field current torque.

The magnetic flux Φm created by the permanent magnets 13 flows into the segments 11 of the second group (e.g., the left one in FIG. 4), passes through the spaces 12 between the segments 11, and then flows out of the segments 11 of the first group (e.g., the right one in FIG. 4) toward the stator 6. As described previously, the segments 11 of the first group are magnetized by the permanent magnets 13 to have N polarity, whereas those of the second group are magnetized by the same to have S polarity.

Assuming an ideal condition without magnetic saturation of the segments 11, for each of the segments 11, the magnetic flux Φm is equally distributed to the pair of salient-pole portions 111 of the segment 11. Consequently, as shown in FIG. 4, the magnetic flux Φm can be equivalently considered to flow along a magnetic path that includes the q and −q axes. As a result, the magnet torque Tm produced by the synchronous motor 1 becomes equal to Φm×Id.

Figure 5:
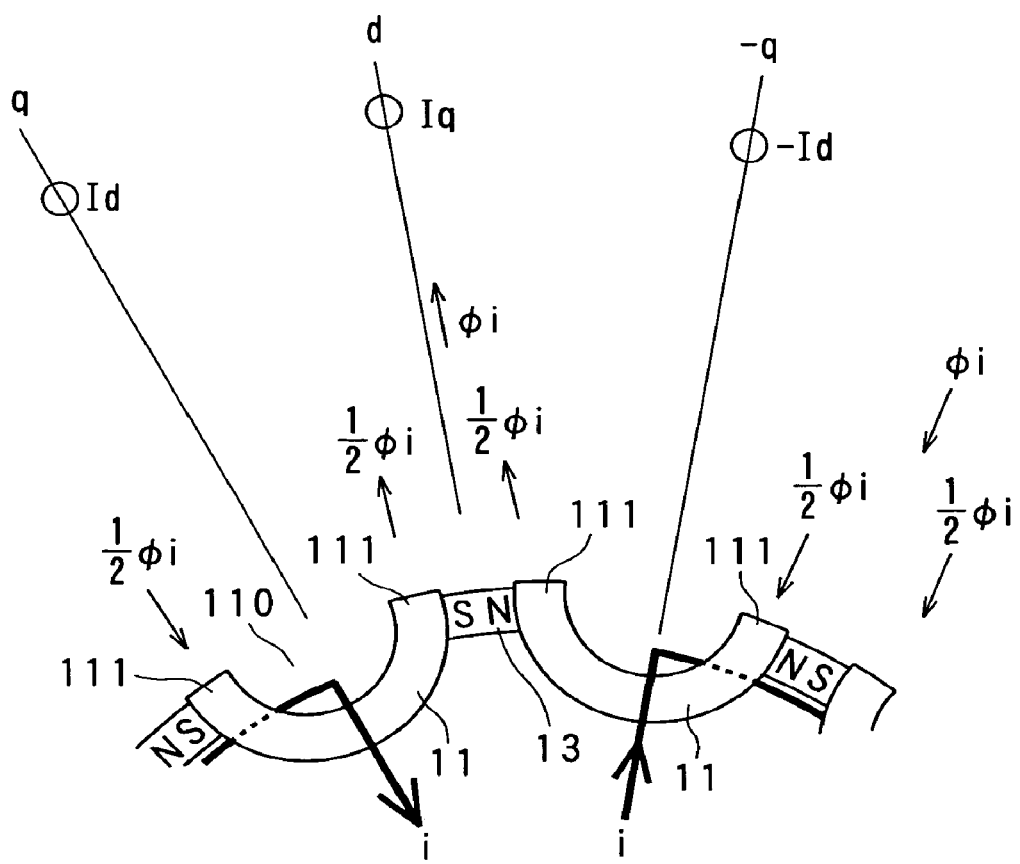
FIG. 5 is a schematic view of the rotor of FIG. 2 illustrating generation of "field current torque" in the synchronous motor according to the first embodiment.

FIG. 5 illustrates generation of the field current torque in the synchronous motor 1, neglecting those of the reluctance torque Tr and the magnet torque Tm.

The magnetic flux Φi created by supplying the field current If to the field coil 14 flows out of those salient-pole portions 111 of the segments 11 which are adjacent to the permanent magnets 13 of the first group, passes through the stator 6, and then flows into those salient-pole portions 111 of the segments 11 which are adjacent to the permanent magnets 13 of the second group. As described previously, the permanent magnets 13 of the first group each have its N pole located forward of its S pole in the clockwise direction, whereas those of the second group each have its N pole located forward of its S pole in the counterclockwise direction.

For example, among the three permanent magnets 13 depicted in FIG. 5, only the centrally-located one belongs to the first group, while the other two belongs to the second group. Accordingly, the magnetic flux Φi flows out of the two salient-pole portions 111 adjacent to the centrally-located permanent magnet 13, passes through the stator 6 (not depicted in FIG. 5), and then flows into the remaining salient-pole portions 111.

Assuming again the ideal condition without magnetic saturation of the segments 11, for each of the permanent magnets 13, the magnetic flux Φi is equally distributed to the pair of salient-pole portions 111 adjacent to the permanent magnet 13. Consequently, as shown in FIG. 5, the magnetic flux Φi can be equivalently considered to flow along a magnetic path that includes the d and −d axes. As a result, the field current torque Ti produced by the synchronous motor 1 becomes equal to Φi×Iq.

Consequently, in the present embodiment, the total torque produced by the synchronous motor 1 is equal to (Tr+Tm+Ti), i.e., ((Ld−Lq)×Id×Iq+Φm×Id+Φi×Iq).

Moreover, in the present embodiment, the permanent magnets 13 of the first group are alternately arranged with those of the second group in the circumferential direction of the rotating shaft 8; each of the permanent magnets 13 of the first group has its N pole located forward of its S pole in the clockwise direction; each of the permanent magnets 13 of the second group has its N pole located forward of its S pole in the counterclockwise direction.

With the above arrangement of the permanent magnets 13, as can be seen from FIGS. 3 and 4, the magnetic flux Φm created by the permanent magnets 13 flows along the q and −q axes in the opposite direction to the magnetic flux Φq that is created by supplying the three-phase AC current to the stator coil 10. Consequently, the magnetic flux Φq is weakened by the magnetic flux Φm, thereby decreasing the q-axis inductance Lq of the synchronous motor 1.

Furthermore, in the present embodiment, the field coil 14 is so wound around the segments 11 as to extend in the circumferential direction of the rotating shaft 8 via the recesses 110 of the segments 11. The field coil 14 creates, when energized with the DC field current If, the magnetic flux Φi which magnetizes the pair of salient-pole portions 111 of each of the segments 11 in opposite directions.

With the above configuration of the field coil 14, as can be seen from FIGS. 3 and 5, the magnetic flux Φi created by supplying the field current If to the field coil 14 flows along the d and −d axes in the same direction as the magnetic flux Φd that is created by supplying the three-phase AC current to the stator coil 10. Consequently, the magnetic flux Φd is strengthened by the magnetic flux Φi, thus increasing the d-axis inductance Ld of the synchronous motor 1.

As a result, with the decreased q-axis inductance Lq and the increased d-axis inductance Ld, the reluctance torque Tr of the synchronous motor 1 is increased.

Further, the magnetic fluxes Φd, Φq, Φm, Φi together magnetize the salient-pole portions 111 of the segments 11 in various ways. For example, in FIG. 2, among the four circumferentially adjacent salient-pole portions 111A, 111B, 111C, and 111d, the salient-pole portion 111A is magnetized by the magnetic fluxes to form a strong N Pole, whereas the salient-pole portion 111C is magnetized by the same to form a strong S pole; at the salient-pole portions 111B and 111D, the magnetic fluxes are canceled by each other, so that each of the portions 111B and 111D forms an O pole (i.e., a Nonpolarity pole).

In addition, it is possible to prevent magnetic saturation of the salient-pole portions 111 of the segments 11 by suitably controlling the stator current and the field current If supplied to the field coil 14.

When the synchronous motor 1 rotates at a high speed, the magnetic flux Φm created by the permanent magnets 13 may induce a large back electromotive force in the stator coil 10. In this case, it is possible to suitably control the stator current to produce an additional electromotive force in the stator coil 10 to cancel the back electromotive force induced by the magnetic flux Φm.

In a low-speed operating region, where the field current If has been increased to its maximum value, the total torque produced by the synchronous motor 1 can be adjusted by controlling the d-axis current Id and the q-axis current Iq. On the other hand, in a high-speed operating region, where the field current If is far less than its maximum value, the total torque produced by the synchronous motor 1 can be adjusted by controlling the field current If.

Second Embodiment

Figure 6:
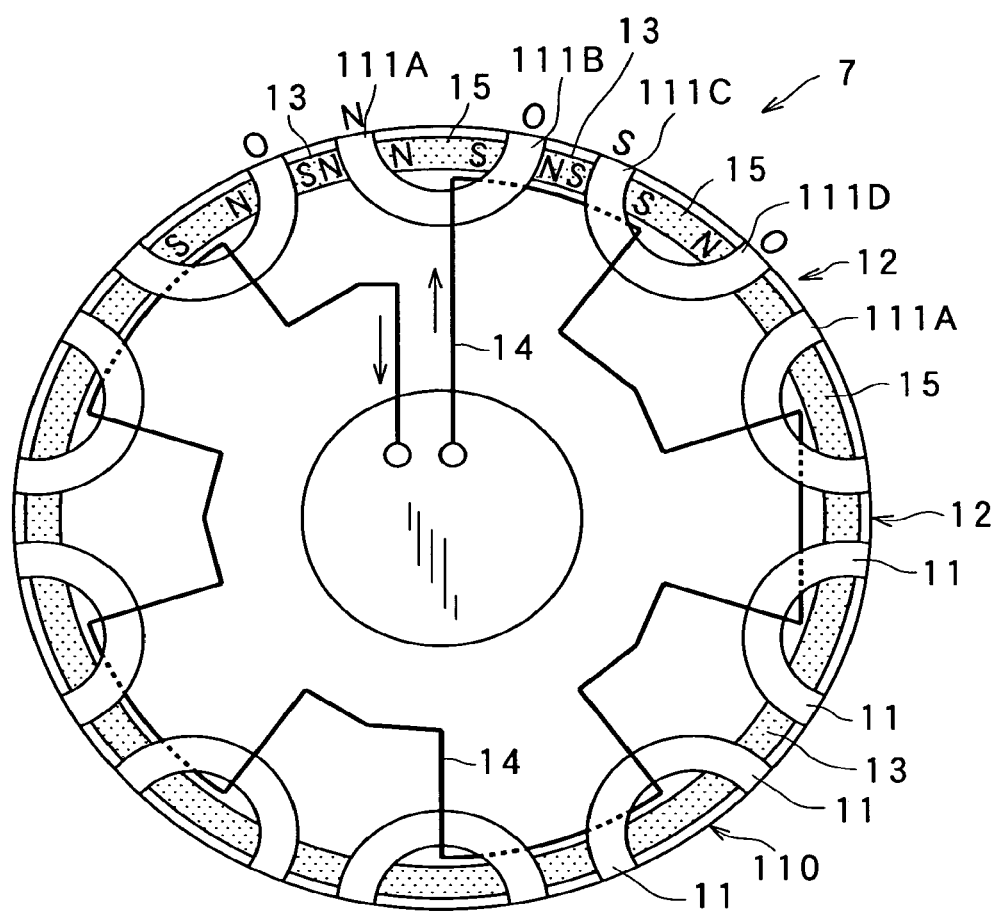
FIG. 6 is a schematic view showing the overall structure of a rotor according to the second embodiment of the invention, wherein the rotor is viewed along the axial direction thereof.

Referring to FIG. 6, in the present embodiment, the rotor 7 further includes a plurality of permanent magnets 15.

Each of the permanent magnets 15 is disposed in the recess 110 of a corresponding one of the segments 11 and has its N and S poles opposed to each other in the circumferential direction of the rotating shaft 8, so as to magnetize the corresponding segment 11 in a direction opposite to the direction in which the field coil 14 magnetizes the corresponding segment 11.

Consequently, each of the permanent magnets 15 has its N and S poles oriented in the same direction as those of one (e.g., the right one in FIG. 6) of the two adjacent permanent magnets 13 and in the opposite direction to those of the other (e.g., the left one in FIG. 6).

As a result, in FIG. 6, among the four circumferentially adjacent salient-pole portions 111A, 111B, 111C, and 111D, the magnetizations of the salient-pole portions 111A and 111C are enhanced by the permanent magnets 15, whereas those of the salient-pole portions 111B and 111D are weakened by the same.

Accordingly, with the permanent magnets 15, it is possible to increase the total torque produced by the synchronous motor 1, in particular the magnet torque explained in the first embodiment.

Moreover, in the present embodiment, each of the permanent magnets 15 is magnetically connected in parallel with the corresponding segment 11. Consequently, the magnetic flux created by the permanent magnet 15 is generally short-circuited by the corresponding segment 11, hardly flowing to the stator 6. Therefore, when the synchronous motor 1 has been reversely operated as a synchronous generator and is going to stop the power-generating operation, the magnetic flux created by the permanent magnets 15 hardly induces electric current in the stator coil 10. Moreover, when the synchronous motor 1 rotates at a high speed, the magnetic flux created by the permanent magnets 15 hardly induces a large back electromotive force in the stator coil 6; it is thus unnecessary to produce an additional electromotive force in the stator coil 10 to cancel the back electromotive force. On the other hand, when high torque is needed, it is also possible to make the magnetic flux created by the permanent magnets 15 flow to the stator 6 by suitably controlling the stator current and the field current If supplied to the field coil 14.

Third Embodiment

Figure 7:
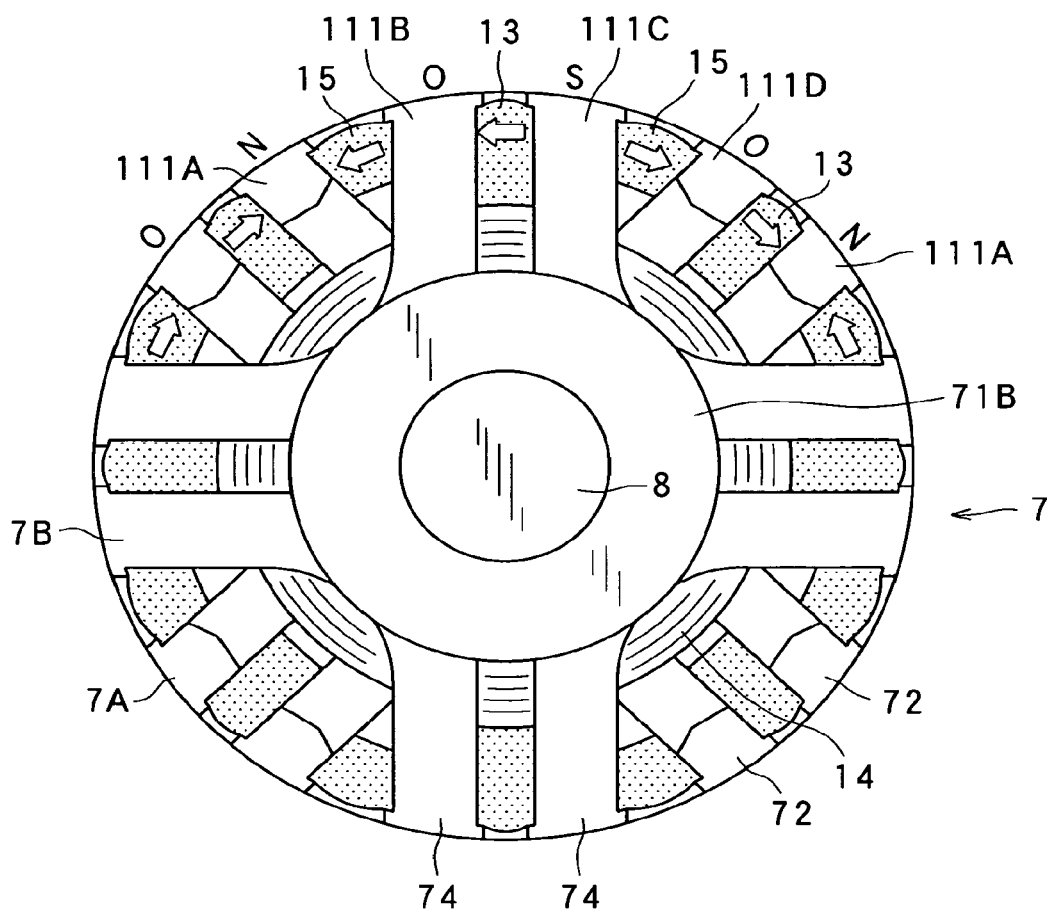
FIG. 7 is a schematic view showing the overall structure of a rotor according to the third embodiment of the invention, wherein the rotor is viewed along the axial direction thereof.

Referring to FIG. 7, in the present embodiment, the rotor 7 is configured with a Lundell-type rotor core that consists of a pair of rotor core pieces 7A and 7B made of a soft magnetic material.

The rotor core piece 7A, which is located inside in the axial direction of the rotating shaft 8 in FIG. 7, includes a cylindrical boss portion 71A (invisible in FIG. 7) and a plurality of "L"-shaped claw-pole portions 72. The boss portion 71A is fitted on the rotating shaft 8. Each of the claw-pole portions 72 first extends in the radial direction of the rotating shaft 8 from the boss portion 71A, and then extends in the axial direction of the rotating shaft 8 toward the rotor core piece 7B (i.e., outward in FIG. 7).

The rotor core piece 7B, which is located outside in the axial direction of the rotating shaft 8 in FIG. 7, includes a cylindrical boss portion 71B and a plurality of "L"-shaped claw-pole portions 74. The boss portion 71B is fitted on the rotating shaft 8 to abut the boss portion 71A of the rotor core piece 7A. Each of the claw-pole portions 74 first extends in the radial direction of the rotating shaft 8 from the boss portion 71B, and then extends in the axial direction of the rotating shaft 8 toward the rotor core piece 7A (i.e., inward in FIG. 7).

The rotor core pieces 7A and 7B are so assembled together that pairs of the claw-pole portions 72 of the rotor core piece 7A are interleaved with pairs of the claw-pole portions 74 of the rotor core piece 7B. As a result, each circumferentially-adjacent pair of one of the claw-pole portions 72 and one of the claw-pole portions 74 makes up one of the segments 11 of the rotor 7; each of all the claw-pole portions 72 and 74 makes up one of the salient-pole portions 111 of the segments 11.

Accordingly, with the above configuration, it is possible to easily manufacture the rotor 7 of the synchronous motor 1.

Figure 8:
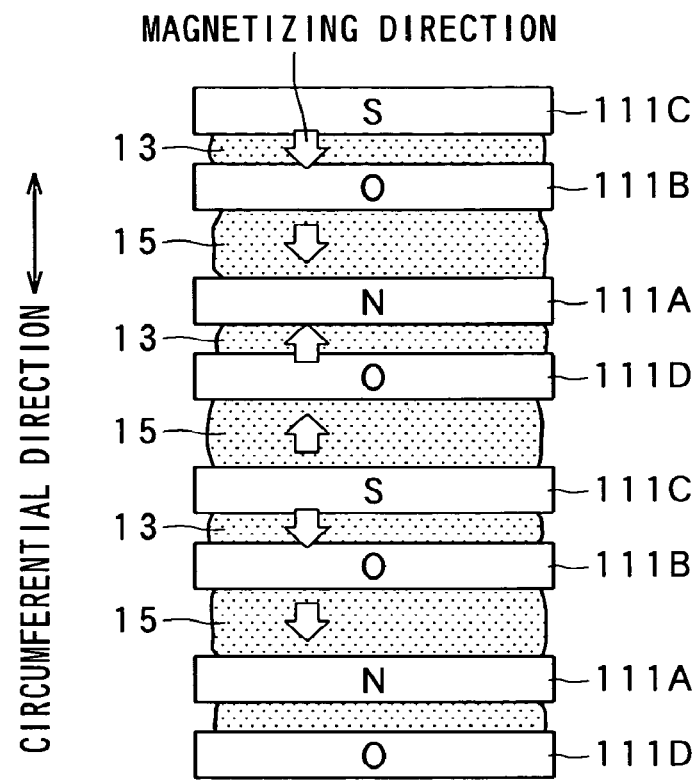
FIG. 8 is a circumferential development of the rotor of FIG. 7 showing the radially outer surface of the rotor.

In addition, the radially outer surface of the rotor 7 according to the present embodiment is shown in FIG. 8.

[Modification]

In the rotor 7 shown in FIG. 7, for each of the permanent magnets 13, the two salient-pole portions 111 (i.e., two claw-pole portions 72 or two claw-pole portions 74) adjacent to the permanent magnet 13 are magnetically short-circuited via the boss portion 71A or 71B. Therefore, it is preferable to magnetically isolate at least one of the two salient-pole portions 111 from the boss portion 71A or 71B.

Figure 9:
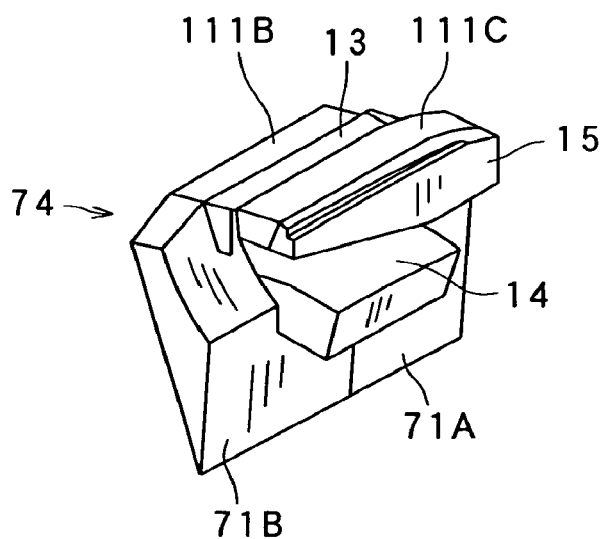
FIG. 9 is a schematic perspective view illustrating a modification of the rotor of FIG. 7.

For example, in FIG. 9, the salient-pole portion 111C is made separate from both the boss portions 71A and 71B. In addition, though not illustrated in FIG. 9, the salient-pole portion 111C may be mechanically supported by either of the boss portions 71A or 71B via a nonmagnetic member interposed therebetween.

Fourth Embodiment

Figure 10:
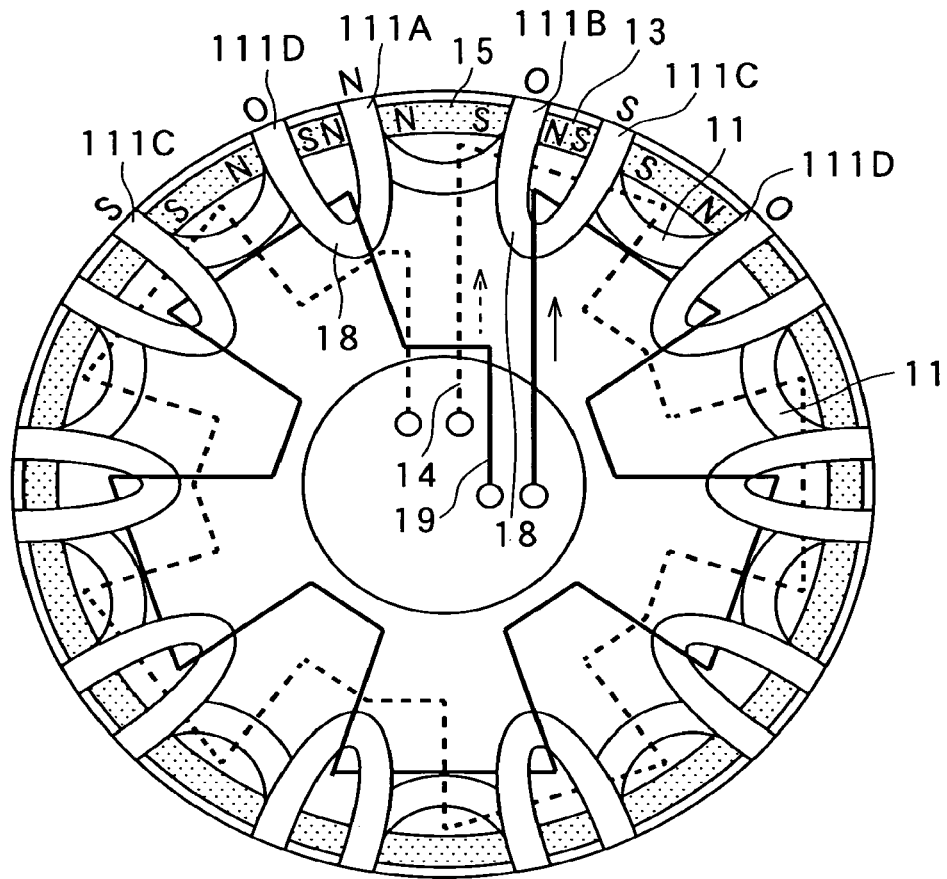
FIG. 10 is a schematic view showing the overall structure of a rotor according to the fourth embodiment of the invention, wherein the rotor is viewed along the axial direction thereof.

Referring to FIG. 10, in the present embodiment, the rotor 7 further includes a plurality of segments 18 made of a soft magnetic material and a field coil 19.

Each of the segments 18 is connected in parallel with a corresponding one of the permanent magnets 13 to magnetically short-circuit the corresponding permanent magnet 13. The field coil 19 is wound around the segments 18 to extend in the circumferential direction of the rotating shaft 8.

With the above configuration, when field current supply to the field coil 19 is stopped, the magnetic flux created by the permanent magnets 13 mostly flows to the segments 18, hardly flowing to the stator 6. Therefore, when the synchronous motor 1 has been reversely operated as a synchronous generator and is going to stop the power-generating operation, the magnetic flux created by the permanent magnets 13 hardly induces electric current in the stator coil 10. Moreover, when the synchronous motor 1 rotates at a high speed, the magnetic flux created by the permanent magnets 13 hardly induces a large back electromotive force in the stator coil 10 in the stator coil 6.

Furthermore, with the above configuration, it is possible to control the flow of magnetic flux in the segments 18 by controlling the field current supply to the field coil 19.

For example, to completely eliminate the flow of magnetic flux from the permanent magnets 13 to the stator 6, it is possible to supply field current to the field coil 19 in a direction to magnetize the segments 18 in the opposite direction to the permanent magnets 13. Consequently, it becomes unnecessary to supply a high AC current to the stator coil 10 for cancelling a back electromotive force which may otherwise be induced in the stator coil 10 by the magnetic flux created by the permanent magnets 13.

On the other hand, when high torque is needed, it is possible to supply the field current to the field coil 19 in a direction to magnetize the segments 18 in the same direction as the permanent magnets 13, thereby allowing the magnetite flux created by the permanent magnets 13 to flow to the stator 6; it is also possible to make the magnetic flux created by the field coil 19 flow to the stator 6.

Fifth Embodiment

Figure 11:
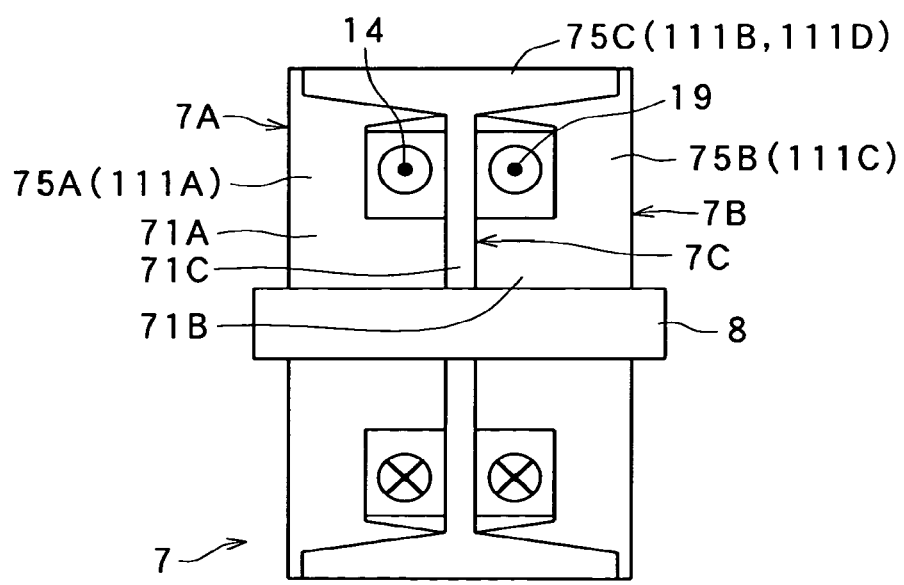
FIG. 11 is a schematic side view showing the overall structure of a rotor according to the fifth embodiment of the invention.
Figure 12:
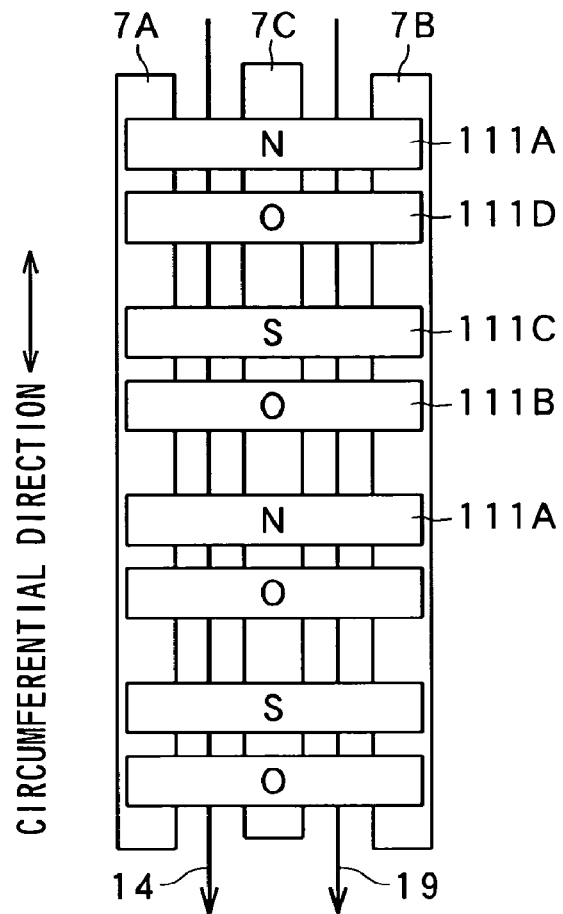
FIG. 12 is a circumferential development of the rotor of FIG. 11 showing the radially outer surface of the rotor.

Referring to FIGS. 11 and 12, in the present embodiment, the rotor 7 is configured with a Lundell-type tandem rotor core that consists of three rotor core pieces 7A, 7B, and 7C.

All the rotor core pieces 7A, 7B, and 7C are made of a soft magnetic material, and fitted on the rotating shaft 8 with the rotor core piece 7C sandwiched between the rotor core pieces 7A and 7B.

The rotor core piece 7A includes a cylindrical boss portion 71A and a plurality of "L"-shaped claw-pole portions 75A. The boss portion 71A is fitted on the rotating shaft 8. Each of the claw-pole portions 75A first extends in the radial direction of the rotating shaft 8 from the boss portion 71A, and then extends in the axial direction of the rotating shaft 8 toward the rotor core piece 7B (i.e., rightward in FIG. 11).

The rotor core piece 7B includes a cylindrical boss portion 71B and a plurality of "L"-shaped claw-pole portions 75B. The boss portion 71B is fitted on the rotating shaft 8. Each of the claw-pole portions 75B first extends in the radial direction of the rotating shaft 8 from the boss portion 71B, and then extends in the axial direction of the rotating shaft 8 toward the rotor core piece 7A (i.e., leftward in FIG. 11).

The rotor core piece 7C includes a cylindrical boss portion 71C and a plurality of "T"-shaped claw-pole portions 75C. The boss portion 71C has a smaller axial width than the boss portions 71A and 71B of the rotor core pieces 7A and 7B, and is fitted on the rotating shaft 8 between the boss portions 71A and 71B. Each of the claw-pole portions 75C first extends in the radial direction of the rotating shaft 8 from the boss portion 71C, and then extends in the axial direction of the rotating shaft 8 both toward the rotor core piece 7A and toward the rotor core piece 7B (i.e., both leftward and rightward in FIG. 11).

The rotor core pieces 7A, 7B, and 7C are so assembled together that: each of the claw-pole portions 75A of the rotor core piece 7A makes up a salient-pole portion 111A of the rotor 7; each of the claw-pole portions 75B of the rotor core piece 7B makes up a salient-pole portion 111C of the rotor 7; and each of the claw-pole portions 75C of the rotor core piece 7C makes up a salient-pole portion 111B or 111D of the rotor 7. As a result, each circumferentially-adjacent pair of one of the salient-pole portions 111A and one of the salient-pole portions 111D makes up one of the segments 11 of the rotor 7; each circumferentially-adjacent pair of one of the salient-pole portions 111C and one of the salient-pole portions 111B makes up one of the segments 18 of the rotor 7. In other words, the rotor core pieces 7A and 7C together make up the segments 11, while the rotor core pieces 7B and 7C together make up the segments 18. In addition, the field coil 14 is provided in the form of a ring interposed between the rotor core pieces 7B and 7C; the field coil 19 is provided in the form of a ring interposed between the rotor core pieces 7B and 7C.

With the above-described rotor 7 according to the present embodiment, it is possible to achieve the same advantages as with the rotor 7 according to the fourth embodiment.

Sixth Embodiment

Figure 13:
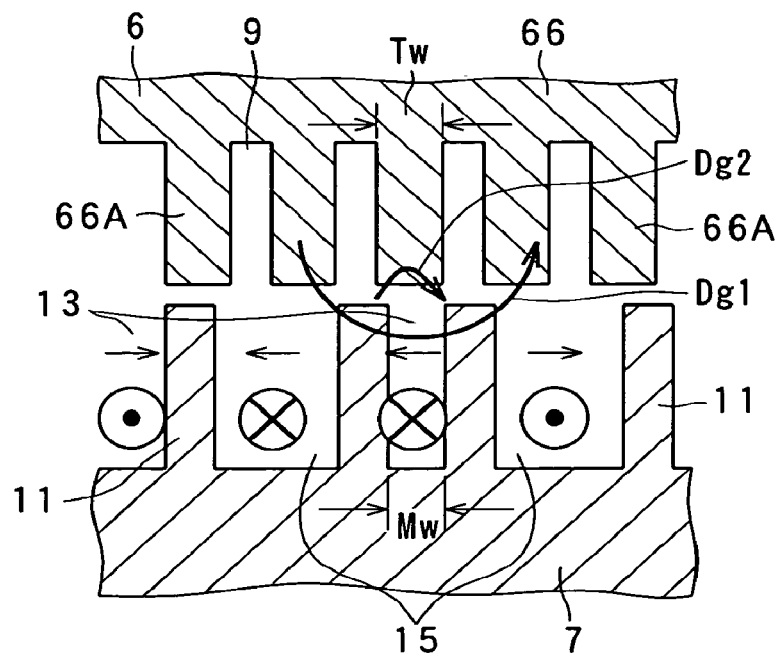
FIG. 13 is a schematic cross-sectional view showing part of a comparative synchronous motor.
Figure 14:
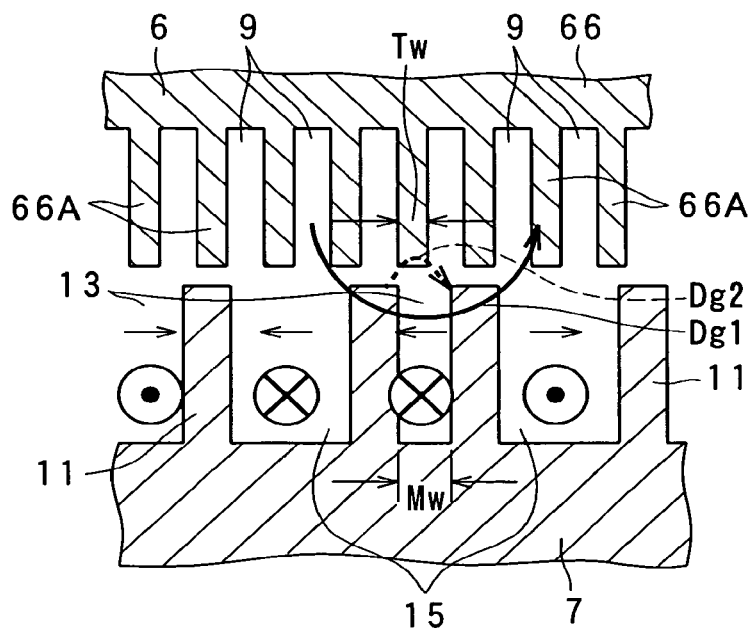
FIG. 14 is a schematic cross-sectional view showing part of a synchronous motor according to the sixth embodiment of the invention.

Referring to FIGS. 13 and 14, in this embodiment, the stator 6 of the synchronous motor 1 will be described.

The stator 6 includes a stator core 66 that surrounds the rotor 7 and the three-phase stator coil 10 (not shown in FIGS. 13 and 14) wound around the stator core 66.

The stator core 66 has a plurality of stator teeth 66A that are formed on the radially inner periphery of the stator core 66 to protrude radially inward (i.e., downward in FIGS. 13 and 14). The stator teeth 66A are arranged in the circumferential direction of the rotating shaft 9 at a predetermined pitch, forming slots 9 therebetween. Each of the stator teeth 66A has a circumferential width TW at the radially inner end thereof. On the other hand, on the radially outer periphery of the rotor 7, the permanent magnets 13 are alternately arranged with the permanent magnets 15. As described in the previous embodiments, the permanent magnets 13 are provided between the segments 11 of the rotor 7, while the permanent magnets 15 are provided within the segments 11. Each of the permanent magnets 13 has a circumferential width Mw at the radially outer end thereof.

When the width Tw of the stator teeth 66A is greater than the width Mw of the permanent magnets 13 (i.e., Tw>Mw), as shown in FIG. 13, the magnetic flux flows between the q and −q axes not only along a magnetic path Dg1 but also along a magnetic path Dg2. That part of the magnetic flux flowing along the magnetic path Dg2 makes up leakage magnetic flux, which results in an increase in the q-axis inductance Lq and thus a decrease in the reluctance torque Tr of the synchronous motor 1. Moreover, the leakage magnetic flux increases with the width Tw of the stator teeth 66A.

In view of the above, in the present embodiment, the width Tw of the stator teeth 66A is set to be less than the width Mw of the permanent magnets 13 (i.e., Tw<Mw). Further, each pair of side walls of the stator teeth 66A which define one of the slots 9 are made parallel to each other. Consequently, most of the magnetic flux between the q and −q axes comes to flow along the magnetic path Dg1, leaving only a very small part of the same to flow along the magnetic path Dg2. As a result, the q-axis inductance Lq of the synchronous motor 1 is decreased, thereby increasing the reluctance torque Tr of the synchronous motor 1.

Seventh Embodiment

Figure 15:
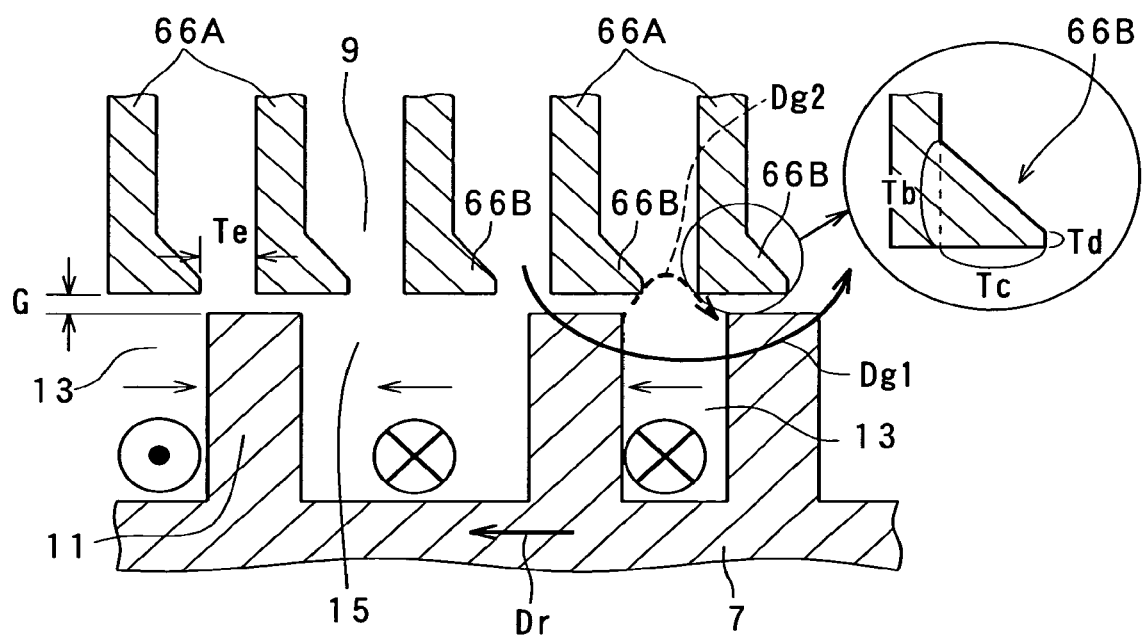
FIG. 15 is a schematic cross-sectional view showing part of a synchronous motor according to the seventh embodiment of the invention.

Referring to FIG. 15, in the present embodiment, the rotor 7 rotates in a direction Dr. Each of the stator teeth 66A of the stator core 66 has formed, at the radially inner end thereof, a protrusion 66B that protrudes in a direction opposite to the rotation direction Dr of the rotor 7.

Further, the protrusion 66B tapers in the protruding direction to have a trapezoidal cross section. Consequently, the width Tb of the protrusion 66B in the radial direction of the rotating shaft 8 at the base of the protrusion 66B is greater than the width Td of the protrusion 66B in the radial direction at the tip of the same.

Moreover, in the present embodiment, the width Tb of the protrusion 66B is made substantially equal to the protruding height Tc of the protrusion 66B. The circumferential width Te of each of the slots 9 at the radially inner end thereof is made greater than twice the protruding height Tc of the protrusion 66B (i.e., Te>2Tc).

The above-described protrusion 66B is designed based on the following consideration.

Figure 16:
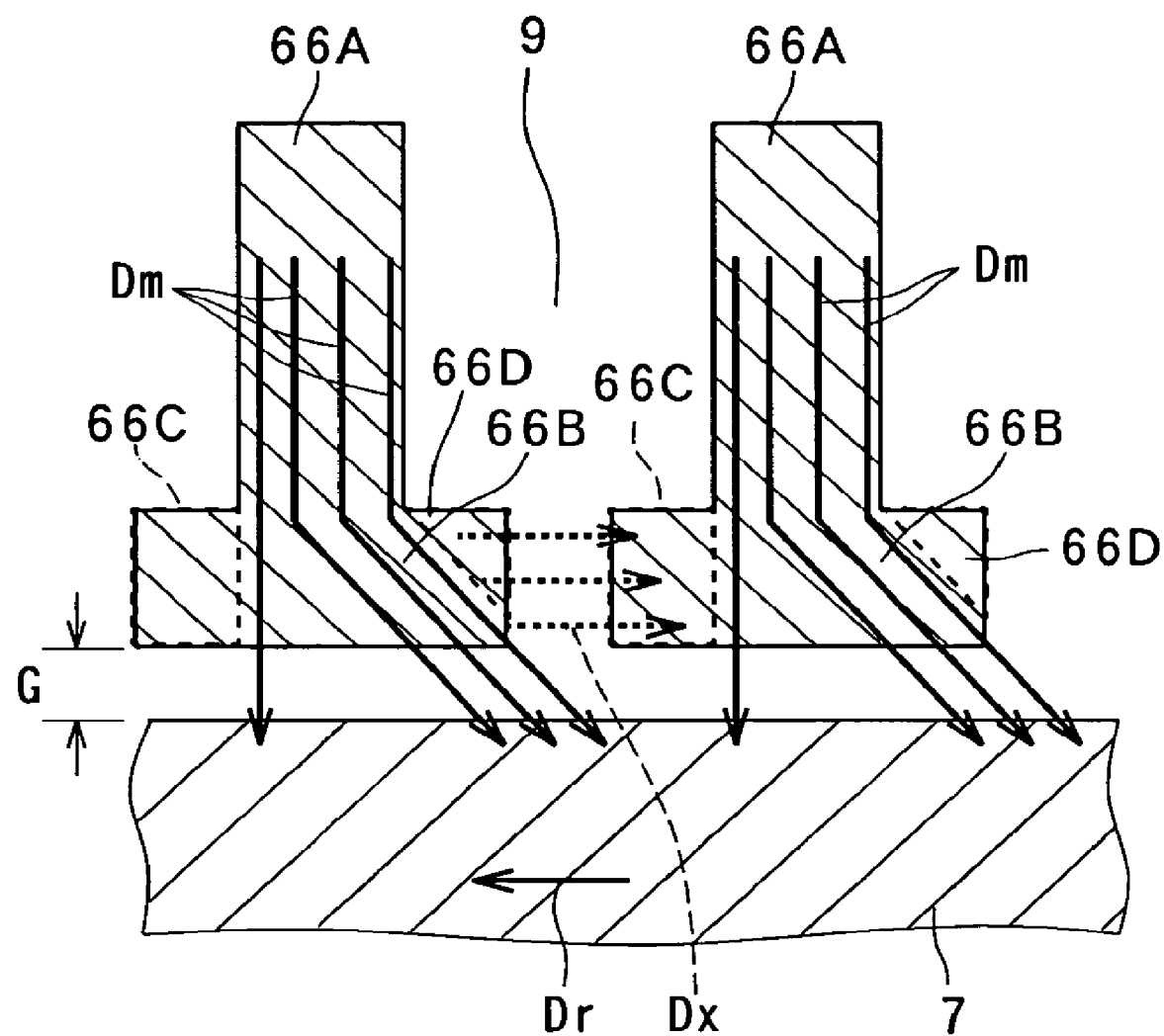
FIG. 16 is a schematic cross-sectional view illustrating the design concept of the synchronous motor of FIG. 15.

Referring to FIG. 16, the stator teeth 66A are generally "T"-shaped. Moreover, the radial air gap G between the stator teeth 66A and the rotor 7 is made constant in the circumferential direction of the rotating shaft 8. When the rotor 7 rotates in the direction Dr, most of the magnetic flux from the stator teeth 66A to the rotor 7 flows along a magnetic path Dm that is deviated from the radial direction toward the opposite direction to the direction Dr. Further, to decrease the leakage magnetic flux along a magnetic path Dx between the stator teeth 66A, it is preferable to cut out a rectangular portion 66C and a triangular portion 66B, both of which are shown with dashed lines in FIG. 16, from each of the stator teeth 66A. Furthermore, to allow the magnetic flux to reliably flow along the magnetic path Dm, it is preferable that Tb=Tc; otherwise, part of the magnetic flux would flow along the magnetic path Dx, forming the leakage magnetic flux.

With the above configuration of the protrusion 66B, it is therefore possible to decrease the q-axis inductance Lq, thereby increasing the reluctance torque Tr of the synchronous motor 1.

Moreover, after providing the protrusion 66B in each of the stator teeth 66A, the radial air gap G can be still kept constant in the circumferential direction of the rotating shaft 11, thereby avoiding a decrease in the efficiency of the motor 1. Furthermore, with Tb being equal to Tc, it is possible to prevent magnetic saturation of the segments 11 of the rotor 7. In addition, with Te being greater than 2Tc, it is possible to further reliably suppress the leakage magnetic flux along the magnetic path Dx, thereby increasing the reluctance torque Tr of the synchronous motor 1.

While the above particular embodiments of the invention have been shown and described, it will be understood by those skilled in the art that various modifications, changes, and improvements may be made without departing from the spirit of the invention.

What is claimed is:

1. A synchronous motor comprising a stator and a rotor surrounded by the stator, the stator including a stator core and a multi-phase stator coil to create a rotating magnetic field, the rotor including:
   a rotating shaft about which the rotor rotates;
   a plurality of segments made of a soft magnetic material, the segments being located radially outward of the rotating shaft and arranged in a circumferential direction of the rotating shaft at a predetermined pitch with spaces formed therebetween, each of the segments having a recess and a pair of ends, the recess being formed in a circumferentially-central portion of the segment and recessed radially inward from a radially outer periphery of the rotor to make up a magnetic reluctance portion, the pair of ends being opposed to each other in the circumferential direction of the rotating shaft, with the recess interposed therebetween, to respectively make up a pair of salient-pole portions;
   a plurality of permanent magnets each of which is disposed in one of the spaces between the segments and belongs to one of first and second groups, the permanent magnets of the first group being alternately arranged with the permanent magnets of the second group in the circumferential direction of the rotating shaft, each of the permanent magnets of the first group having its N (North) pole located forward of its S (South) pole in a clockwise direction, each of the permanent magnets of the second group having its N pole located forward of its S pole in a counterclockwise direction; and
   a field coil that is wound around the segments to extend in the circumferential direction of the rotating shaft through the recesses of the segments, the field coil being configured to create, when energized with DC current, magnetic flux which magnetizes the pair of ends of each of the segments in opposite directions.

2. The synchronous motor as set forth in claim 1, wherein the rotor further includes a plurality of second permanent magnets, and
   each of the second permanent magnets is disposed in the recess of a corresponding one of the segments and has its N and S poles opposed to each other in the circumferential direction of the rotating shaft so as to magnetize the corresponding segment in the opposite direction to the field coil.

3. The synchronous motor as set forth in claim 1, wherein the rotor is configured with a Lundell-type rotor core that is made of a soft magnetic material, and
   each of the segments of the rotor is made up of a circumferentially-adjacent pair of claw-pole portions of the rotor core.

4. The synchronous motor as set forth in claim 1, wherein the rotor further includes a plurality of soft magnetic members and a second field coil,
   each of the soft magnetic members is connected in parallel with a corresponding one of the permanent magnets to magnetically short-circuit the corresponding permanent magnet, and
   the second field coil is wound around the soft magnetic members to extend in the circumferential direction of the rotating shaft, so as to allow control of magnetic flux flowing in the soft magnetic members through control of field current supply to the second coil.

5. The synchronous motor as set forth in claim 4, wherein the rotor is configured with a Lundell-type tandem rotor core that is made of a soft magnetic material, and
   each of the segments and soft magnetic members of the rotor is made up of a circumferentially-adjacent pair of claw-pole portions of the rotor core.

6. The synchronous motor as set forth in claim 1, wherein the stator core surrounds the rotor to face the rotor in a radial direction of the rotating shaft,
   the stator core includes a plurality of stator teeth that are formed on a radially inner periphery of the stator core to protrude radially inward,
   the stator teeth are arranged in the circumferential direction of the rotating shaft at a predetermined pitch, forming slots therebetween, and
   Tw<Mw, where Tw is a circumferential width of each of the stator teeth at a radially inner end thereof, and Mw is a circumferential width of each of the permanent magnets at a radially outer end thereof.

7. The synchronous motor as set forth in claim 1, wherein each of the stator teeth has formed, at the radially inner end thereof, a protrusion that protrudes in the direction opposite to a rotation direction of the rotor,
   the protrusion tapers in the direction opposite to the rotation direction of the rotor, so that Tb>Td, where Tb is a width of the protrusion in the radial direction of the rotating shaft at a base of the protrusion, and Td is a width of the protrusion in the radial direction at a tip of the protrusion,
   a protruding height Tc of the protrusion is substantially equal to Tb,
   each pair of side walls of the stator teeth which define one of the slots are substantially parallel to each other, and
   Te>2Tc, where Te is a circumferential width of each of the slots at a radially inner end thereof.

* * * * *